Feb. 28, 1961 S. T. KOHN 2,973,470
VOLTAGE REGULATOR
Filed Jan. 30, 1959

SAMUEL T. KOHN
INVENTOR

BY Ralph W. E. Bitner.
ATTORNEY

United States Patent Office 2,973,470
Patented Feb. 28, 1961

2,973,470

VOLTAGE REGULATOR

Samuel T. Kohn, South Norwalk, Conn., assignor, by mesne assignments, to Sorensen & Company, Incorporated, South Norwalk, Conn., a corporation of Delaware Filed Jan. 30, 1959, Ser. No. 790,125

5 Claims. (Cl. 323—60)

This invention relates to a voltage regulator having two cores one of which is saturated for all values of load current, the other core being nonsaturated when the load current is zero and saturated when full load current is being delivered. The voltage regulator depends upon the variation of a saturable core reactor in parallel with a capacitor to produce resonance or near-resonance as the load and the applied voltage are varied.

The application of saturable core reactors in combination with variable resonance is old in the art and many such regulators have been designed and used. While these regulators are quite useful, the regulation they produce is not close enough for many applications. Also, the weight of prior art voltage regulators of this class is often excessive, especially when such regulators are to be used on airplanes and other airborne equipment.

The present invention is based on the same resonance principle but uses two cores with a circuit arrangement which permits lighter equipment for a given output power and closer regulation of the output voltage.

One of the objects of this invention is to provide an improved voltage regulator which avoids one or more of the disadvantages and limitations of prior art arrangements.

Another object of the invention is to reduce the weight of voltage regulators.

Another object of the invention is to increase the regulation of the output voltage.

The invention comprises two magnetic cores each of which may be saturated. The first magnetic core is designed to be operated at a nonsaturated condition when the load current is zero but contains a saturating flux at full load current. The second magnetic core is made of the same material but is designed to carry a saturating flux at all values of load current. The primary circuit which is to be connected to a source of alternating current power, may vary in applied voltage and includes conductive windings which link both of the cores. The output circuit includes the output terminals which are to be connected to a load, the voltage of which is maintained within a narrow range of values. The output circuit also includes conductive windings which link both of the cores and includes a resonant circuit formed by a portion of one of the output windings and a capacitor.

For a better understanding of the present invention, together with other and further objects thereof, reference is made to the following description taken in connection with the accompanying drawings.

Figure 1:
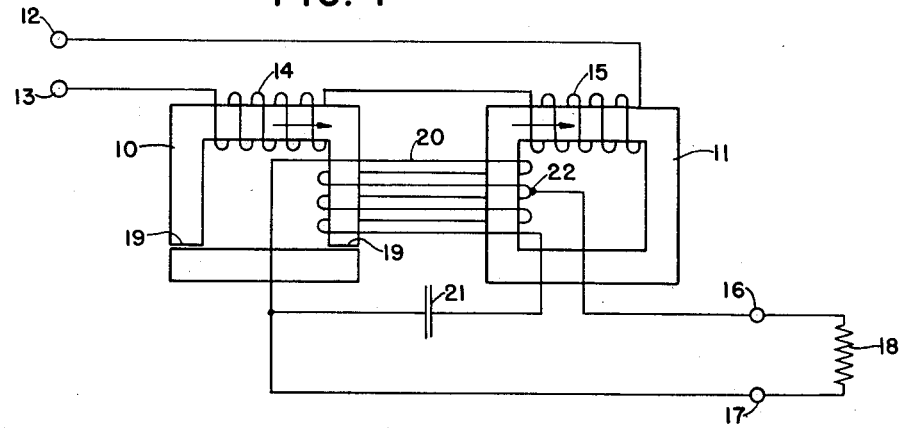
Fig. 1 is a schematic diagram of connections of one form of the voltage regulator.

Referring now to Fig. 1, the voltage regulator comprises two cores 10 and 11. An input circuit includes terminals 12 and 13 and a first winding 14 on core 10 and a second winding 15 on core 11. The cores may be of equal size and weight and be made of the same core material, such as Hypersil, and if this is done windings 14 and 15 are arranged so that the flux they produce in the cores have a ratio of 1 to 4. This arrangement insures that the first core 10 will be unsaturated at no load while the second core 11 will always be saturated. The first core 10 is generally made with a pair of short air gaps 19.

The secondary or output circuit includes output terminals 16 and 17 which are connected to a load 18, the voltage of which is maintained within a very narrow range of values. The secondary circuit also includes a winding 20 which encloses portions of both cores 10 and 11. The terminals of winding 20 are connected to a capacitor 21 having a capacity which, taken in conjunction with the inductance of winding 20, exceeds by a substantial amount the LC value necessary for resonance at the frequency of the applied alternating current. One side of winding 20 is connected to output terminal 17 while the other output terminal 16 is connected to a tap 22 on winding 20. The position of tap 22 is determined by the value of output voltage desired.

The flux produced in cores 10 and 11 is indicated, for one-half cycle, by arrows on the figure. This means that the flux in the first core produces an induced voltage in coil 20 which is opposed to the induced voltage produced by the flux in the second core 11. Since the flux in the second core is about four times as strong as the flux in the first core, the voltage produced by the second core predominates.

The operation of this circuit may be explained as follows: At no load the only current through winding 20 is the off-resonant current through capacitor 21. The current in windings 14 and 15 is slightly more than the exciting current. Core 11 is saturated and core 10, because of a fewer number of turns on winding 14 and because of the air gaps 19 is unsaturated.

When a load is connected to terminals 16 and 17 current is drawn from part of winding 20. This current provides a flux which opposes the flux in winding 15 and aids the flux in core 10. The flux in core 11 does not change much because, as the induced flux from winding 20 increases, the flux due to winding 15 also increases (because of increased input current) and the difference between these two fluxes is about the same. However, the flux in core 10 is increased a substantial amount because in this core the fluxes add. Windings 14 and 20 both increase their current and the resultant flux in core 10 causes the core to be saturated, lowering the reactance of winding 20 and bringing it closer to a resonant condition. This latter effect increases the output voltage by an amount which is equal to the voltage lost due to increased voltage drops when the current was raised.

Figure 2:
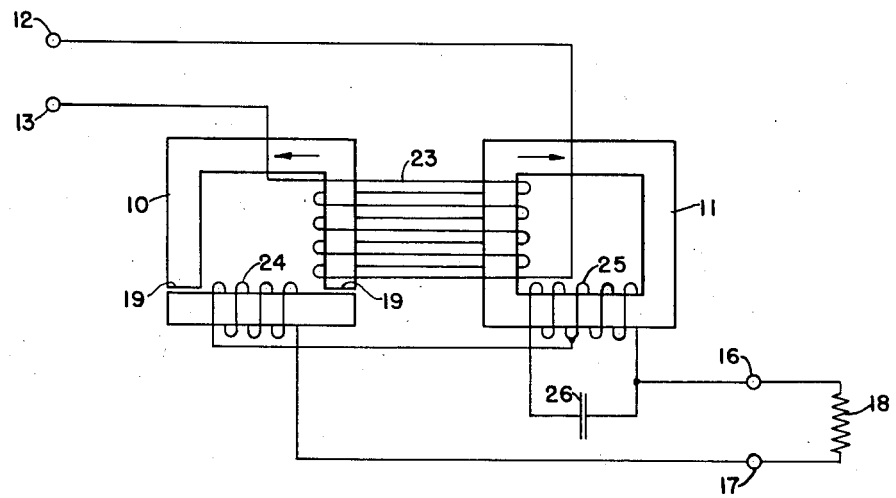
Fig. 2 is a schematic diagram of connections of the preferred form of the invention.

The voltage regulator shown in Fig. 2 has the same cores 10 and 11 as the regulator shown in Fig. 1 and its windings act in the same manner. In this arrangement the input terminals 12, 13, are connected to a single winding 23 which encloses both cores. The secondary circuit includes a winding 24 on core 10 and a winding 25 on core 11. A capacitor 26 is connected across the ends of winding 25 and, as before, the LC value of capacitor 21 and inductor winding 25 is substantially greater than necessary for resonance. The output circuit includes all of winding 24 and a portion of winding 25. As before, the induced voltage due to the flux in core 10 opposes the voltage due to the flux in core 11. The operation is substantially the same.

Figure 3:
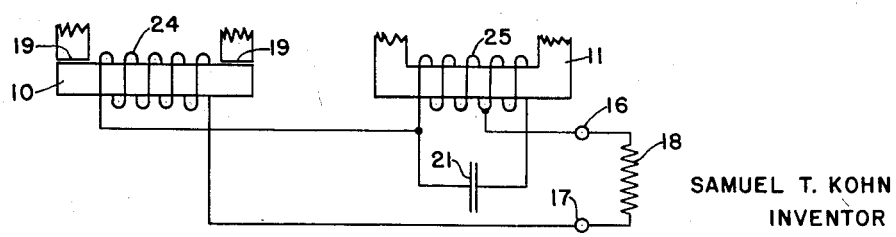
Fig. 3 shows an alternate connecting circuit for joining the output windings of Fig. 2 to a load.

The arrangement shown in Fig. 3 is a minor variation of the circuit shown in Fig. 2, where the tap on winding 25 is connected to output terminal 16 instead of coil 24.

In one practical embodiment of the regulator shown in Fig. 2, coil 23 had 138 turns, coil 24 had 107 turns and coil 25 had 367 turns. The tap on coil 25 was 219 turns from the output end of the coil and capacitor 26 was 18 microfarads.

The foregoing disclosure and drawings are merely illustrative of the principles of this invention and are not to be interpreted in a limiting sense. The only limitations are to be determined from the scope of the appended claims.

I claim:

1. An alternating current voltage regulator comprising; a pair of input terminals which are to be connected to a source of alternating current power which may vary in applied voltage; a pair of output terminals which are to be connected to a load, the voltage of which is maintained within a narrow range of values; a first magnetic core which is designed to carry non-saturating flux at zero load currents and saturating flux at full load current; a second magnetic core which is designed to carry a saturating flux at all load currents, a primary circuit which includes the input terminals, a winding on the first core, and a winding on the second core; and a secondary circuit which includes a secondary winding which surrounds both of said cores, a capacitor connected across said secondary winding, one of said output terminals connected to one end of the secondary winding, and the other of said output terminals connected to said secondary winding at a point intermediate the two ends.

2. A voltage regulator as set forth in claim 1 wherein said capacitor and said secondary winding have values at full load current which produce resonance at the frequency of said alternating current power.

3. An alternating current voltage regulator comprising; a pair of input terminals which are to be connected to a source of alternating current power which may vary in applied voltage; a pair of output terminals which are to be connected to a load, the voltage of which is maintained within a narrow range of values; a first magnetic core which is designed to carry non-saturating flux at zero load currents and saturating flux at full load current; a second magnetic core which is designed to carry a saturating flux at all load currents; a primary circuit which includes the input tetrminals, a winding on the first core, and a winding on the second core; and a secondary circuit which includes said output terminals, a secondary winding surrounding both of said cores, and a capacitor connected across said secondary winding; one of said output terminals connected to one end of the secondary winding, and the other of said output terminals connected to said secondary winding at a point intermediate the two ends; the primary winding on the first core and the primary winding on the second core arranged to produce magnetic flux in said first and second cores which generate opposing voltages in said secondary winding.

4. An alternating current voltage regulator as set forth in claim 3 wherein said capacitor and said secondary winding are resonant at a frequency substantially below the frequency of the applied alternating current power when the load is disconnected.

5. An alternating current voltage regulator as set forth in claim 3 wherein said cores are made of similar materials and are of substantially the same size, the first of said cores having at least one air gap.

References Cited in the file of this patent

UNITED STATES PATENTS

| 907,931 | Williams | Dec. 29, 1908 |
| 1,967,108 | Werner | July 17, 1934 |
| 2,706,271 | Fletcher | Apr. 12, 1955 |

FOREIGN PATENTS

| 463,947 | Great Britain | Apr. 5, 1937 |